US012633165B2

(12) United States Patent
Shin et al.

(10) Patent No.: US 12,633,165 B2
(45) Date of Patent: May 19, 2026

(54) ELECTRONIC DEVICE IDENTIFYING DIRECTION OF GAZE AND METHOD FOR OPERATING THE SAME

(71) Applicant: SAMSUNG ELECTRONICS CO., LTD., Suwon-si (KR)

(72) Inventors: Sunghwan Shin, Suwon-si (KR); Bonkon Koo, Suwon-si (KR); Doyoun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 18/214,004

(22) Filed: Jun. 26, 2023

(65) Prior Publication Data

US 2024/0062584 A1    Feb. 22, 2024

Related U.S. Application Data

(63) Continuation of application No. PCT/KR2023/007940, filed on Jun. 9, 2023.

(30) Foreign Application Priority Data

Aug. 9, 2022    (KR) ......................... 10-2022-0099328

(51) Int. Cl.
*G06V 40/18*          (2022.01)
*G06F 3/01*           (2006.01)

(52) U.S. Cl.
CPC ............ *G06V 40/193* (2022.01); *G06F 3/016* (2013.01)

(58) Field of Classification Search
CPC ............................. G06V 40/193; G06F 3/016

USPC ......................................................... 382/117
See application file for complete search history.

(56) References Cited

U.S. PATENT DOCUMENTS

| | | | | |
|---|---|---|---|---|
| 7,682,026 | B2 * | 3/2010 | Huffman ................ | G06V 40/19 |
| | | | | 351/209 |
| 9,983,709 | B2 * | 5/2018 | Trail ........................ | G06F 3/041 |
| 10,248,197 | B2 * | 4/2019 | Abed Aljawad .... | G06F 3/04842 |
| 10,614,577 | B1 | 4/2020 | Cavin et al. | |
| 11,073,906 | B1 * | 7/2021 | Hudman .............. | G06N 3/0442 |
| 11,983,315 | B2 * | 5/2024 | Ryu .......................... | G06T 7/73 |

(Continued)

FOREIGN PATENT DOCUMENTS

| | | |
|---|---|---|
| JP | 2018-101211 A | 6/2018 |
| KR | 10-2018-0064413 A | 6/2018 |

(Continued)

OTHER PUBLICATIONS

International Search Report dated Sep. 11, 2023, issued by the International Searching Authority in International Application No. PCT/KR2023/007940 (PCT/ISA/210).

(Continued)

*Primary Examiner* — William D Titcomb
(74) *Attorney, Agent, or Firm* — Sughrue Mion, PLLC

(57) ABSTRACT

An electronic device may include a camera and at least one processor. The at least one processor may be configured to obtain an eye image of a user through the camera, obtain pupil data and a retina image from the obtained eye image, obtain an eye model including the retina image, based on the obtained pupil data and the obtained retina image, and identify at least one of a position of an eye or a gaze direction, based on the obtained eye model.

19 Claims, 12 Drawing Sheets

(56)  References Cited

U.S. PATENT DOCUMENTS

| | | | |
|---|---|---|---|
| 2008/0049185 A1* | 2/2008 | Huffman | A61B 3/113 |
| | | | 351/206 |
| 2013/0070988 A1 | 3/2013 | Makihira | |
| 2017/0116459 A1* | 4/2017 | Chen | G06V 40/19 |
| 2017/0123489 A1* | 5/2017 | Guenter | A63F 13/213 |
| 2017/0123526 A1 | 5/2017 | Trail et al. | |
| 2017/0261750 A1 | 9/2017 | Wong et al. | |
| 2017/0263006 A1* | 9/2017 | Hunt | G06F 1/1637 |
| 2017/0263007 A1 | 9/2017 | Cavin et al. | |
| 2018/0012418 A1 | 1/2018 | Berard et al. | |
| 2018/0292896 A1 | 10/2018 | Hicks et al. | |
| 2019/0121427 A1 | 4/2019 | Qin et al. | |
| 2020/0225745 A1 | 7/2020 | Molin et al. | |
| 2020/0241308 A1 | 7/2020 | Danziger et al. | |
| 2020/0379214 A1* | 12/2020 | Lee | G02F 1/29 |
| 2021/0037232 A1* | 2/2021 | Lin | H04N 13/371 |
| 2021/0325963 A1 | 10/2021 | Hudman et al. | |
| 2022/0206573 A1 | 6/2022 | Dierkes et al. | |
| 2022/0301217 A1* | 9/2022 | Stuart | G06T 7/60 |
| 2022/0404578 A1* | 12/2022 | Lee | H04N 23/671 |
| 2024/0138668 A1* | 5/2024 | Lee | A61B 3/032 |

FOREIGN PATENT DOCUMENTS

| | | |
|---|---|---|
| KR | 10-2018-0115285 A | 10/2018 |
| KR | 10-2020-0044835 A | 4/2020 |
| WO | 2015/015454 A2 | 2/2015 |
| WO | 2017/156486 A1 | 9/2017 |
| WO | 2019/045750 A1 | 3/2019 |
| WO | 2020/141537 A1 | 7/2020 |
| WO | 2022/079585 A1 | 4/2022 |

OTHER PUBLICATIONS

Communication dated Sep. 11, 2023, issued by the International Searching Authority in International Application No. PCT/KR2023/007940 (PCT/ISA/237).

* cited by examiner

ELECTRONIC DEVICE IDENTIFYING DIRECTION OF GAZE AND METHOD FOR OPERATING THE SAME

CROSS-REFERENCE TO RELATED APPLICATIONS

This application is a continuation of International Application No. PCT/KR2023/007940, filed on Jun. 9, 2023, which is based on and claims priority to Korean Patent Application No. 10-2022-0099328, filed on Aug. 9, 2022, in the Korean Intellectual Property Office, the disclosures of which are incorporated by reference herein in their entireties.

BACKGROUND

1. Field

The disclosure relates to a wearable electronic device identifying a gaze direction of the user and method for operating the same according to an embodiment.

2. Description of Related Art

With the development of gaze tracking technology using a camera, there are provided wearable electronic devices that provide information according to the person's interest, such as tracking a person's gaze and enlarging or reducing an object focused on the screen or displaying related information around the object. As an example, the wearable electronic device may be a head mounted device (HMD), an augmented reality (AR) device, or a virtual reality (VR) device that obtains and provides an image of the real world in the direction the user sees through a camera.

The wearable electronic device may be used to optimize the operation and disposition of the display for the user, by tracking the gaze direction of the user, such as enlarging or shrinking a specific portion when the user focuses the specific portion on the display screen.

SUMMARY

According to an aspect of the disclosure, there is an electronic device including: a camera, and at least one processor configured to, obtain an eye image of an eye of a user from the camera, obtain pupil data and a retina image from the eye image, obtain, based on the pupil data and the retina image, an eye model including the retina image, and identify, based on the eye model, at least one of a position of the eye or a gaze direction.

The electronic device may further include a light source configured to emit light of a preset wavelength band to the eye.

The at least one processor may be further configured to, receive a plurality of eye images, comprising the eye image, according to rotation of the eye from the camera, obtain a plurality of pupil data, comprising the pupil data, and retina images, comprising the retina image, from the plurality of eye images, and obtain, based on the plurality of pupil data and the plurality of retina images, the eye model.

The electronic device may further include a display, and the at least one processor may be further configured to sequentially display an object inducing the gaze of the user to different positions on the display.

The at least one processor may be further configured to identify area of a pupil from the eye image and obtain at least one of a position of a pupil, a shape of the pupil, or the gaze direction based on the area of the pupil.

The at least one processor may be further configured to obtain, based on the at least one of the position of the pupil, the shape of the pupil (P), or the gaze direction, any one of the position of the eye or a shape of the eye.

The at least one processor may be further configured to obtain the eye model by mapping the retina image to the pupil data.

The at least one processor may be further configured to identify, based on the eye model, the at least one of the position of the eye or the gaze direction corresponding to the eye image.

The at least one processor may be further configured to, based on the retina image, determine whether the eye image corresponds to a pre-stored eye image of the user corresponding to a pre-stored eye model.

The at least one processor may be further configured to: identify, from the eye image, area of a pupil corresponding to the pupil; and obtain, based on the area of the pupil, the gaze direction.

The at least one processor may be further configured to, based on the retina image and the eye model, detect whether the position of the eye is changed.

The at least one processor may be further configured to, based on the retina image and the eye model, obtain the position of the eye, when detecting the change in the position of the eye.

According to an aspect of the disclosure, there is a method for operating an electronic device, the method including: obtaining an eye image of an eye of a user from a camera, obtaining pupil data and a retina image from the eye image, obtaining, based on the pupil data and the retina image, an eye model comprising the retina image, and identifying, based on the eye model, at least one of a position of the eye or a gaze direction.

The obtaining the eye image may include receiving, from the camera, a plurality of eye images, comprising the eye image, according to a rotation of the eye, and obtaining the pupil data and the retina image may include obtaining a plurality of pupil data, including the pupil data, and retina images, including the retina image, from the plurality of eye images, and obtaining the eye model may include obtaining, based on the plurality of pupil data and the plurality of retina images, the eye model.

The obtaining the eye image may include obtaining the plurality of eye images while sequentially displaying an object inducing a gaze of the eye to different positions on a display.

The obtaining the pupil data and the retina image may include identifying area of a pupil from the eye image and obtaining, based on the area of the pupil, at least one of a position of a pupil, a shape of the pupil, or the gaze direction, and obtaining the eye model comprises obtaining, based on the at least one of the position of the pupil, the shape of the pupil, or the gaze direction any one of the position of the eye or a shape of the eye.

The identifying the at least one of the position of the eye or the gaze direction may include identifying, based on the eye model, the at least one of the position of the eye or the gaze direction corresponding to the eye image.

The method may further include determining, based on the retina image, whether the eye image corresponds to a pre-stored eye image of the user corresponding to a pre-stored eye model.

The identifying the at least one of the position of the eye or the gaze direction may comprises identifying area of a pupil corresponding to the pupil from the eye image and obtaining, based on the area of the pupil, the gaze direction (G).

The identifying the at least one of the position of the eye or the gaze direction may comprises detecting, based on the retina image and the eye model, whether a position of the eye is changed, and obtaining, based on the retina image and the eye model, the position of the eye, when detecting the change in the position of the eye.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
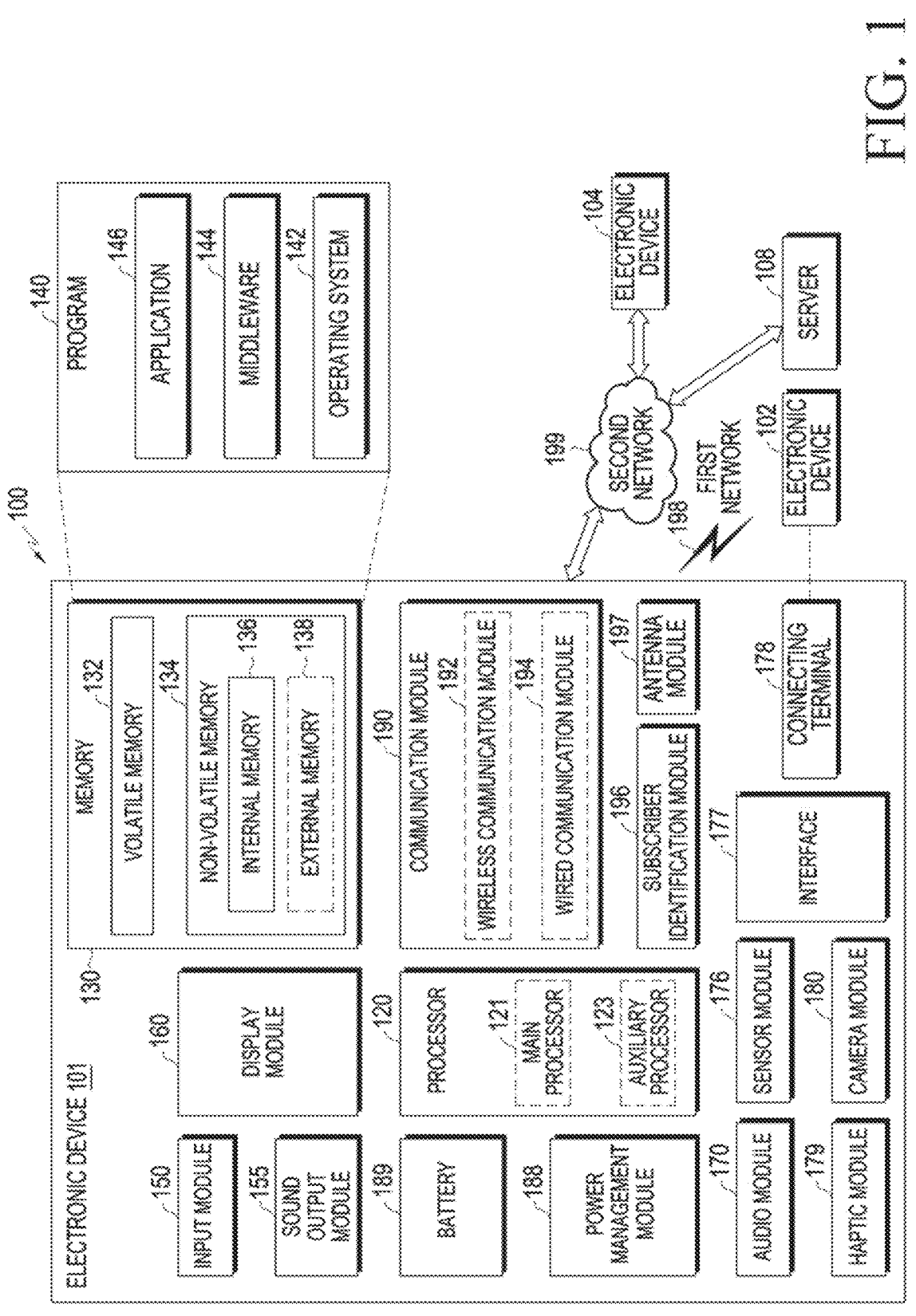
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
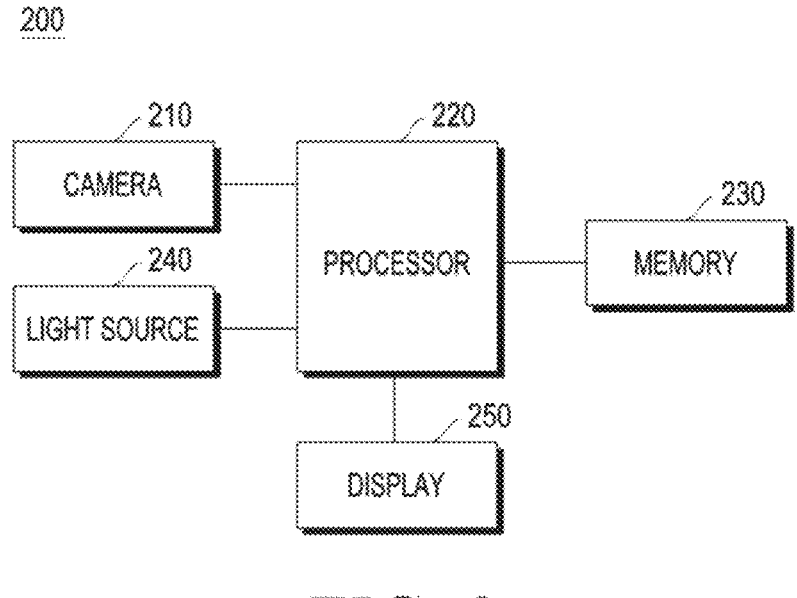
FIG. 2 is a block diagram illustrating an electronic device according to an embodiment of the disclosure.
Figure 3:
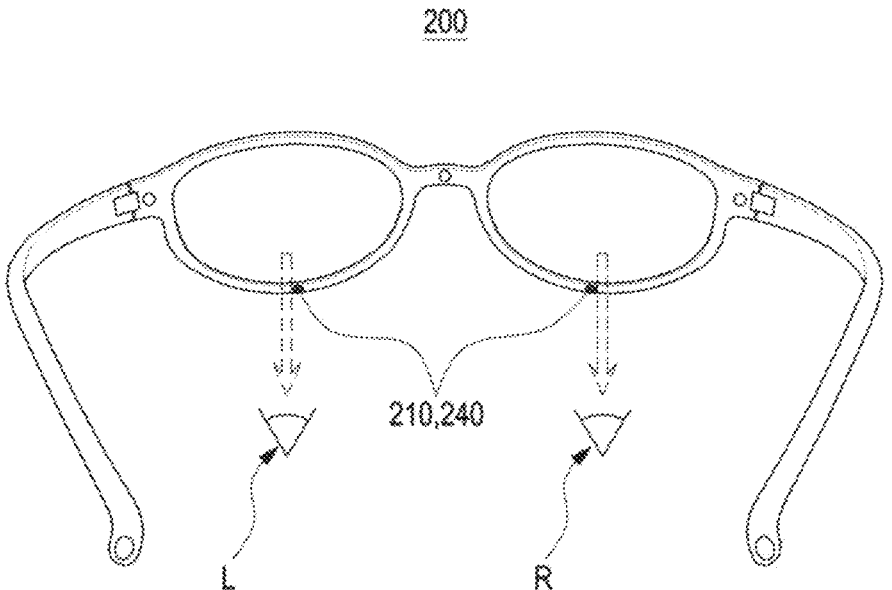
FIG. 3 is a perspective view illustrating an electronic device according to an embodiment of the disclosure.

FIG. 2 is a block diagram illustrating an electronic device 200 according to an embodiment of the disclosure. FIG. 3 is a perspective view illustrating an electronic device 200 according to an embodiment of the disclosure.

Further referring to FIG. 2 and FIG. 3, according to an embodiment, an electronic device 200 may include any of a camera 210 (e.g., the camera module 180 of FIG. 1) obtaining an eye image, a light source 240, a display 250, a processor 220 (e.g., the processor 120 of FIG. 1), and a memory 230 (e.g., the memory 130 of FIG. 1). Here, the electronic device 200 is assumed to be a glasses-type AR device, but is not limited thereto, and may include therein or have an interface to any of the same features described above for the electronic device 101.

In an embodiment, the camera 210 may be fixed to the wearable electronic device 200 worn adjacent to the eyeball of the user, and may obtain an eyeball image of the eyeball of the user wearing the wearable electronic device 200.

In an embodiment, the light source 240 may radiate light of a preset wavelength band to the eye, corresponding to the camera 210. Since both the pupil formed on the surface of the eyeball of the user and the retina inside the eyeball are composed of portions of the spherical eyeball and reflect light incident from the light source 240 substantially as it is, the incident position and the reflected position may be substantially identical. In an embodiment, the light source 240 and the camera 210 may be disposed adjacent to each other as a first pair, having first ones of the light source 240 and camera 210, on a left side for the left eye L and as a second pair, having second ones of the light source 240 and camera 210, on a right side for the right eye R.

In an embodiment, the camera 210 and the light source 240 may be provided to correspond to the left eye L and the right eye R, respectively, of the glasses-shaped wearable electronic device 200. The camera 210 and the light source 240 of the glasses-shaped wearable electronic device 200 may be disposed in positions spaced apart from the left eye L and right eye R of the user and, as an example, be fixed to the lowermost ends of the rims of surrounding the lenses positioned in front of the left eye L and right eye R, respectively.

In an embodiment, the light source 240 may be an IR light source that emits infrared (IR) light, and the camera 210 may be an IR camera. Accordingly, the camera 210 may be robust against interference by visible light introduced from the outside. In an embodiment, the light source 240 may be a visible light source that emits visible light, and the camera 210 may also be an red-green-blue (RGB) camera.

For example, the display 250 may be a liquid crystal display (LCD), a digital mirror device (DMD), a liquid crystal on silicon (LCoS), or an organic light emitting diode (OLED), or a micro light emitting diode (micro LED).

In an embodiment, the display 250 may be a transparent display 250, such as a transparent touchscreen or a transparent window, positioned in the extension line of the gaze direction of the user, and the display 250 may display a transparent (including translucent) screen. As an example, the display 250 may be a transparent lens positioned in front of any of the left eye and the right eye of the user and may output a screen by its own emitting light or light emitted from the outside of the display 250. In an embodiment, the display 250 may provide a screen to the eyes of the user through an optical waveguide formed of glass, plastic, or polymer.

In an embodiment, the processor 220 may be operated by a program previously stored in the memory 230, and operations in the processor 220 are described below. The memory 230 may store data obtained or generated by the processor 220. For example, any of an eye model, obtained based on pupil data, and an eye model, obtained by combining a retinal image with the eye model, may be stored in the memory 230.

Figure 4A:
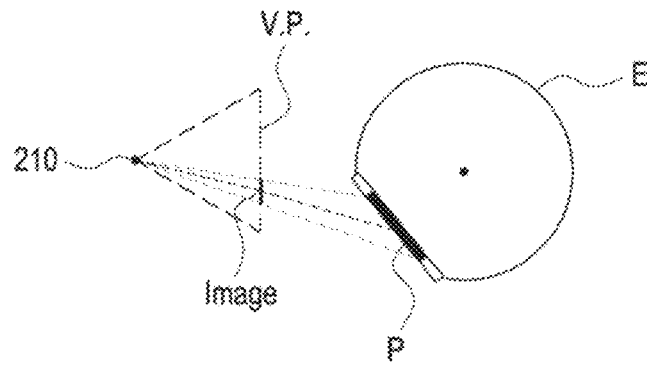
FIG. 4A is a view illustrating a state of obtaining an eye image for an eye of a user according to an embodiment of the disclosure.
Figure 4B:
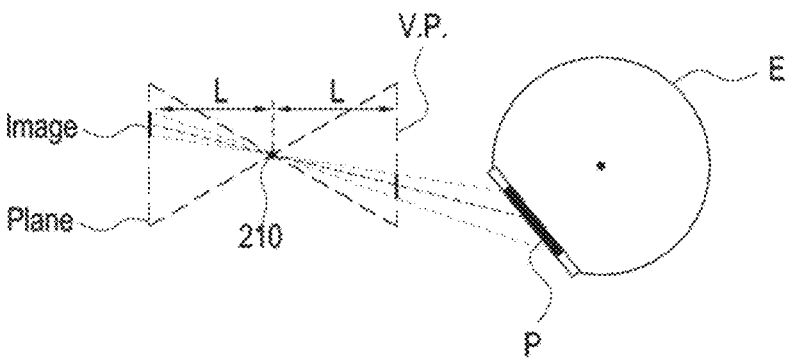
FIG. 4B illustrates an image forming surface according to an embodiment of the disclosure.
Figure 4C:
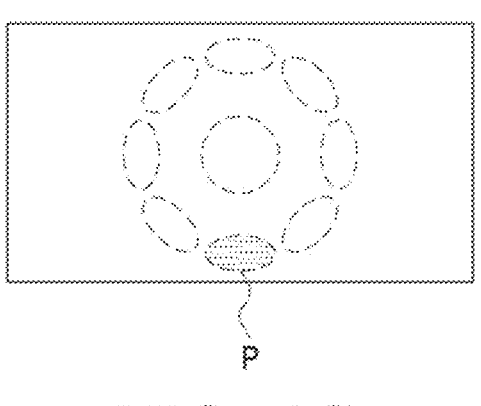
FIG. 4C illustrates a pupil image obtained from an eye image according to an embodiment of the disclosure.

FIG. 4A is a view illustrating a state of obtaining an eye image for an eye E of a user according to an embodiment of the disclosure. FIG. 4B illustrates an image forming surface. FIG. 4C illustrates a pupil (P) image obtained from an eye image according to an embodiment of the disclosure.

Referring to FIG. 4A, FIG. 4B, and FIG. 4C, the camera 210 may be positioned in front of the eye E of the user and capture an eye image for the eye E of the user. Here, the point representing the camera 210 may mean the lens center point of the camera 210, and the range indicated with two dashed-lines from the camera 210 may mean the field of view (FOV) of the camera 210. As an embodiment, the electronic device 200 (e.g., the processor 220 of FIG. 2) may extract the area of the pupil P and the retina image I from the eyeball image captured by the camera 210.

FIG. 4A schematically illustrates a configuration of capturing the eye E of the user by the camera 210 positioned in front of the eye E of the user as if an image forms on the imaging plane V.P. for convenience of understanding. However, in an actual physical phenomenon, it is preferable that as shown in FIG. 4B, the actual imaging plane Plane is positioned in the direction opposite to the eye E which is the subject with respect to the camera 210, and the image of the eye E of the user captured is positioned on the actual imaging plane Plane. Although the subsequent figures are shown in a manner similar to that of FIG. 4A, it is preferable to understand that the actual physical phenomenon occurs in the manner shown in FIG. 4B.

In an embodiment, the electronic device 200 may identify the area of the pupil P from the captured eye image and obtain, based on the identified area of the pupil P, any of the position of the pupil P, the shape of the pupil P, and the gaze direction G of the eye E.

In an embodiment, it is assumed that the position of the eye E is fixed, and the area of the pupil P may be as shown in FIG. 4B according to rotation of the eye E due to various changes in the gaze direction G of the eye E. Specifically, when the gaze direction G of the eye E is directly toward the camera 210, the area of the pupil P may be identified as circular and, when the gaze direction G of the eye E deviates from the capturing direction in an upper/lower or left/right direction, the area of the pupil P may be identified as elliptical. In other words, when the pupil P is rotated from the front of the camera 210, the area of the pupil P may be identified as having an elliptical shape in which the major axis is fixed while the minor axis is changed according to the rotation angle of the eye E.

In an embodiment, the electronic device 200 may identify the area of the pupil P from the eye image and obtain the shape of the pupil P and the position of the pupil P based on the identified area of the pupil P. Specifically, the electronic device 200 may obtain the position information (e.g., x coordinate and y coordinate) about the pupil P on the plane and the circular shape P', as in FIG. 5A, or elliptical shape (length of the major axis and length of the minor axis) of the pupil P.

Figure 5A:
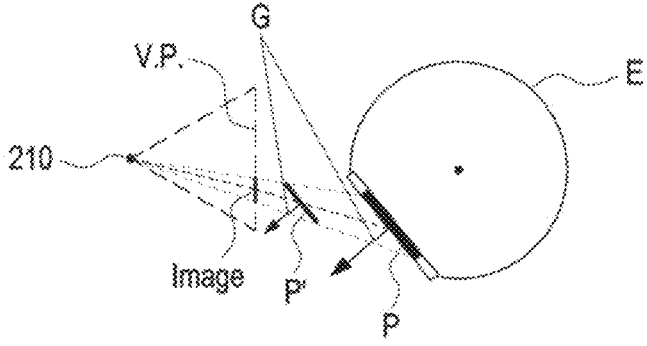
FIG. 5A illustrates a state of restoring a circular shape of a pupil according to an embodiment of the disclosure.
Figure 5B:
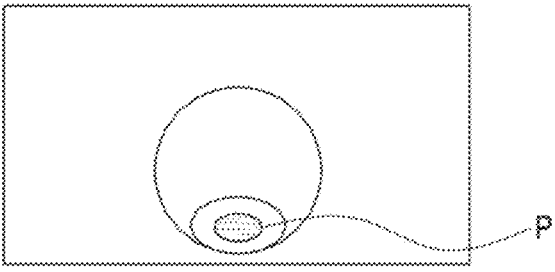
FIG. 5B illustrates a pupil image according to a rotated position of an eye in FIG. 5A according to an embodiment of the disclosure.

FIG. 5A illustrates a state of restoring a circular shape P' of a pupil P according to an embodiment of the disclosure. FIG. 5B illustrates a pupil P image according to a rotated position of an eye E in FIG. 5A according to an embodiment of the disclosure.

Referring to FIG. 5A and FIG. 5B, in an embodiment, the electronic device 200 may obtain the gaze direction G of the eye E and the circular shape P' of the pupil P based on the obtained shape of the pupil P. In an embodiment, the electronic device 200 may calculate the ratio of the length of the major axis and the length of the minor axis from the elliptical shape of the pupil P through the following equation and calculate the angle θ at which the pupil P is rotated from the state in which the gaze direction G of the eye E is directly toward the camera 210.

Equation 1

$$\cos\theta = \frac{\text{length of minor axis}}{\text{length of major axis}} \qquad \text{Eq. (1)}$$

Here, θ is the angle at which the pupil P is rotated from the state in which the gaze direction G of the eyeball E is directly toward the camera 210.

In an embodiment, the electronic device 200 may restore the circular shape P' of the pupil P through the shape of the pupil P and the angle θ at which the pupil P is rotated. For example, since the shape of the pupil P is a shape vertically/horizontally symmetrical, the rotation direction of the eye E may be estimated as two symmetrical directions (e.g., upper direction or lower direction/left direction or right direction). The electronic device 200 may specify the rotation direction of the eye E based on the identified position of the pupil P of the two estimated rotation directions of the eye E.

In an embodiment, the electronic device 200 may identify the area of the pupil P from the eye image captured by the camera 210 and estimate the gaze direction G of the eye E based on the pupil data obtained for the identified area of the pupil P. Further, the electronic device 200 may store the obtained pupil data in the memory (e.g., the memory 130 of FIG. 1 or the memory 230 of FIG. 2). In an embodiment, the pupil data may include any of the position of the pupil P, the shape of the pupil P, the rotation direction of the eye E, and the rotation angle of the eye E.

Figure 6:
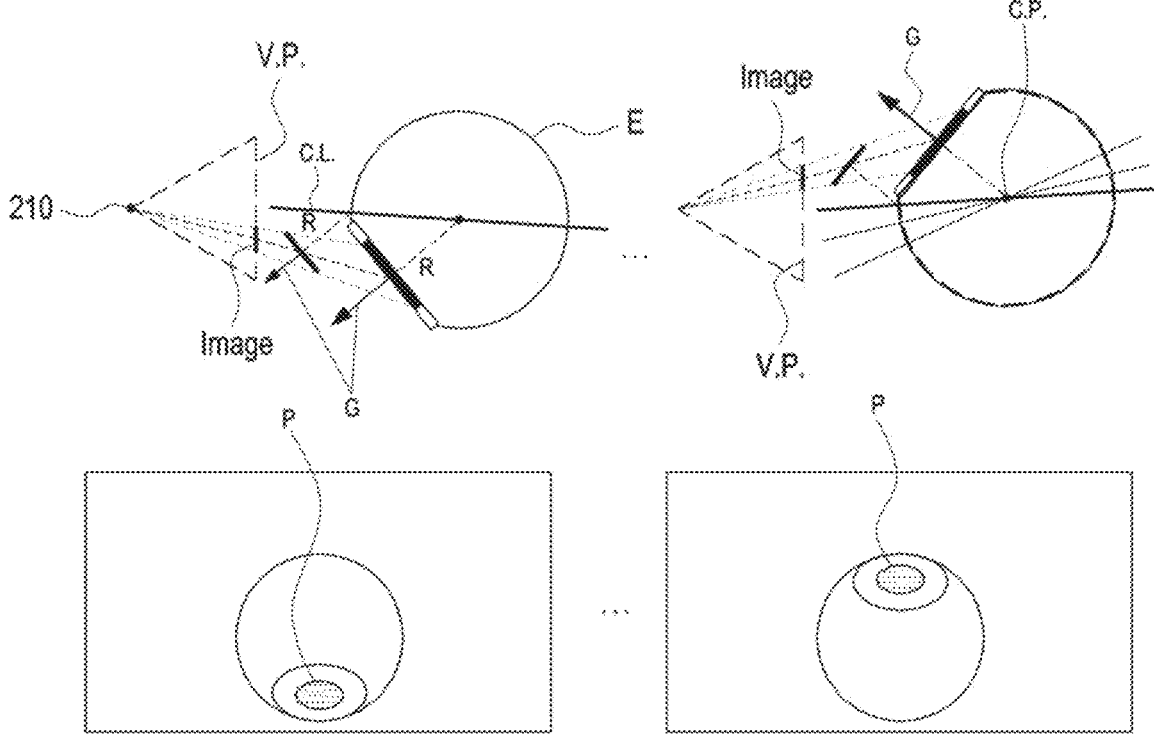
FIG. 6 illustrates an order of obtaining an eye model according to an embodiment of the disclosure.
Figure 8:
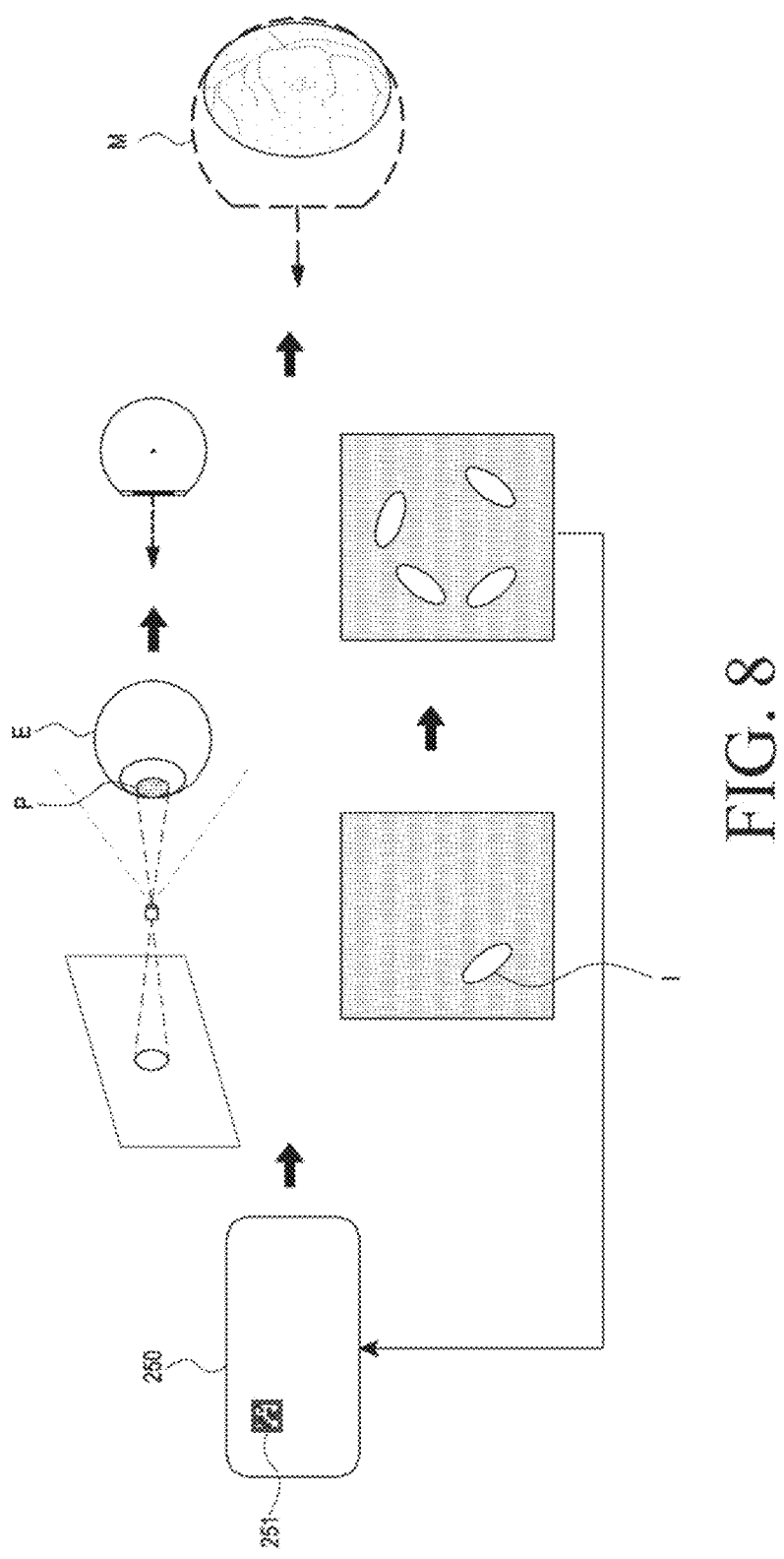
FIG. 8 illustrates an order of obtaining an eye model according to an embodiment of the disclosure.
Figure 9:
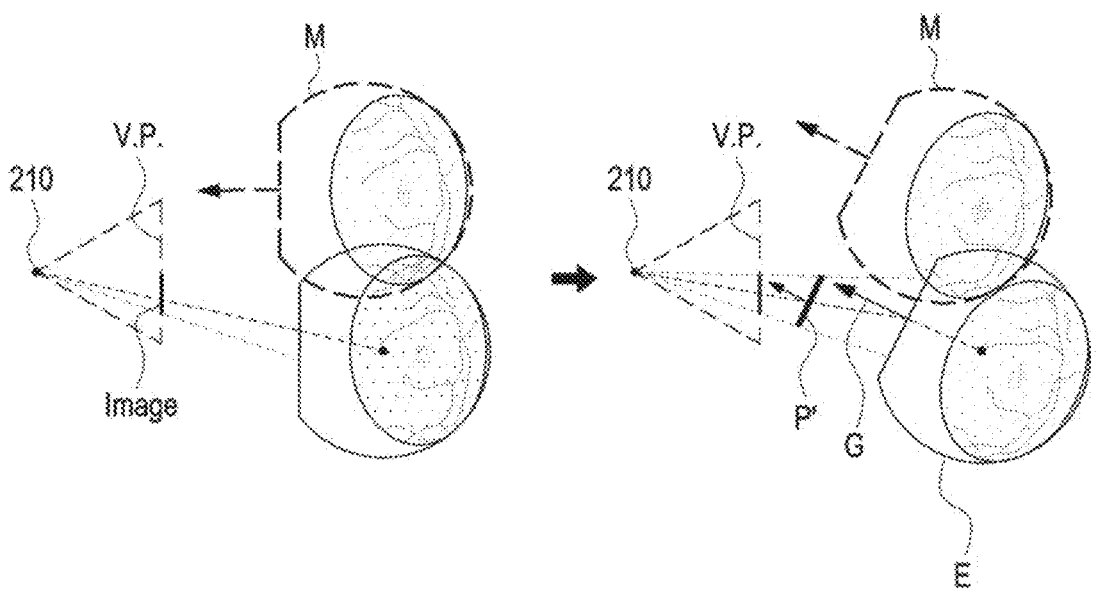
FIG. 9 illustrates a process of identifying a gaze direction based on an eye image and an eye model according to an embodiment of the disclosure.
Figure 10:
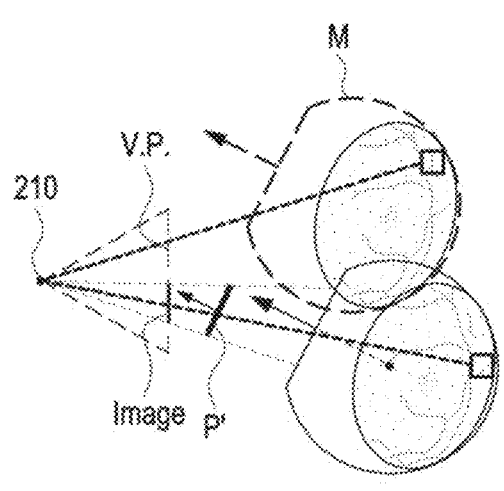
FIG. 10 illustrates a process of detecting a change in the position of an eye according to an embodiment of the disclosure.

FIG. 6 illustrates an order of obtaining an eye model M, such as shown in FIG. 8, FIG. 9, and FIG. 10, according to an embodiment of the disclosure.

Referring to FIG. 6, the electronic device 200 may receive a plurality of eye images according to rotation of the eye E from the camera 210, obtain a plurality of pupil data from the plurality of eye images, and obtain an eye model M based on the plurality of pupil data.

In an embodiment, the electronic device 200 may obtain the center line of the pupil P based on the pupil data obtained from the eye image. Since no three-dimensional coordinates for the center of the pupil P is obtainable, the center line, such as of the center lines C.L., of the pupil P may be a straight line extending in 3D, of the pupil P identified in 2D. The electronic device 200 may obtain the center line of the eye E according to being spaced apart by the radius R of the eye E in a direction perpendicular to the circular shape P' of the pupil P restored from the center line of the pupil P as shown, using the radius R of the eye E, the rotation direction of the eye E, and the center line of the pupil P. Here, as the radius R of the eye E, a value commonly preset as the radius of the eye E may be used, or a value estimated from the eye model M may be used.

In an embodiment, the electronic device 200 may gather a plurality of pupil data from a plurality of eye images according to rotation of the eye E and may thus obtain a plurality of eye center lines C.L. The electronic device 200 may estimate the position where the plurality of obtained eye center lines C.L. converge, as the eye center point C.P. In other words, the electronic device 200 may obtain the eye model M based on any of the plurality of eye images and the plurality of pupil data.

In an embodiment, the eye model M may include any of the position of the eye E and the shape of the eye E. Here, the position of the eye E may mean a 3D position for the eye center point C.P., and the shape of the eye E may mean a spherical shape having the radius R of the eye E from the eye center point C.P.

In an embodiment, the electronic device 200 may identify the area of the pupil P from the eye image received from the camera 210 using the obtained eye model M and estimate the gaze direction G of the eye E based on the pupil data obtained for the identified area of the pupil P.

Figure 7:
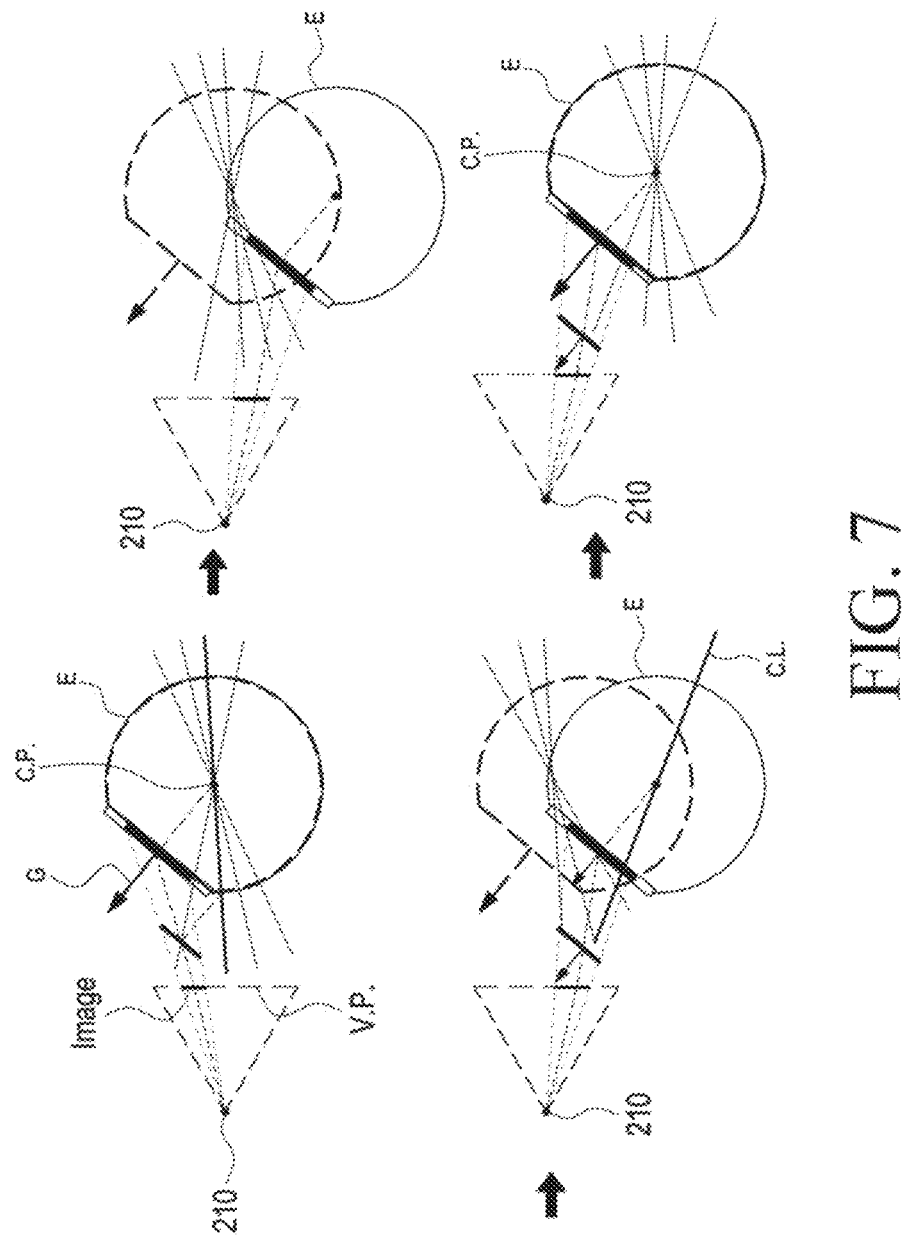
FIG. 7 illustrates a change in eye model according to a movement of an eye according to an embodiment of the disclosure.

FIG. 7 illustrates a change in eye model M according to a movement of an eye E according to an embodiment of the disclosure.

Referring further to FIG. 7, in an embodiment, the position of the eye E of the user may be changed in the operational state of the electronic device 200. For example, a reposition may occur between the electronic device 200 and the eye E due to a slide or shake of the electronic device 200 worn by the user. Here, the reposition of the eye E may mean a relative reposition between the electronic device 200 and the eye E, or a reposition between the camera 210 and the eye E.

In an embodiment, the electronic device 200 may fail to detect the reposition of the eye E and thus update the position of the eye E according to the reposition of the eye E. Therefore, the electronic device 200 may erroneously recognize the change in the area of the pupil P due to the reposition of the eye E as caused by rotation of the eye E, so that an error may occur in estimation of the gaze direction G of the eye E based on the eye model M. The electronic device 200 may continuously update the eye model M based on a newly received eye image to detect the reposition of the eye E but need a sufficient time to update the eye model M with the reposition of the eye E.

FIG. 8 illustrates an order of obtaining an eye model M according to an embodiment of the disclosure.

Referring to FIG. 8, in an embodiment, the electronic device 200 may receive a plurality of eye images according to rotation of the eye E while sequentially displaying an object 251 to induce the gaze of the user in a different position on the display 250.

In an embodiment, the electronic device 200 may obtain a plurality of pupil data from a plurality of eye images and obtain an eye model M from the plurality of pupil data as described above.

In an embodiment, the electronic device 200 may obtain a plurality of retina images I from the plurality of eye images and map the plurality of retina images I respectively corresponding to the plurality of pupil data. The retina image I may be an image obtained by the camera 210 positioned outside the eye E, wherein the light emitted from the light source is incident on the retina inside the eye E through the pupil P, is reflected from the retina, and then passes again through the pupil to be obtained by the camera 210. The plurality of retina images I may be obtained in different retina areas, respectively, inside the eye E as the pupil P is moved according to rotation of the eye E.

In an embodiment, the electronic device 200 may obtain and store, in the memory, a plurality of pupil data including the position of the pupil P, the shape of the pupil P, the rotation direction of the eye E, and the rotation angle of the eye E, from the plurality of eye images and may further store the retina images I respectively corresponding to the pupil data in the memory. The electronic device 200 may create a 3D eye model M based on the plurality of pupil data and map the plurality of retina images I to the created eye model M in the positions respectively corresponding to the pupil data.

In an embodiment, the electronic device 200 may sequentially display the object 251 to induce the user to gaze at the object 251 in a plurality of different positions of the display 250, to induce rotation of the eye E. The gaze direction G of the user may be preset depending on each position of the object 251, and the electronic device 200 may obtain the eye image of the user according to the preset gaze direction G.

In an embodiment, the electronic device 200 may sequentially display the object 251 in a preset position of the display 250. In an embodiment, the electronic device 200 may display the object 251 on the display 250 to induce rotation of the eye E of the user to the rotated position of the eye E corresponding to a position where no retina image I is absent in the eye model M while mapping the plurality of retina images I obtained from the plurality of eye images to the eye model M.

FIG. 9 illustrates a process of identifying a gaze direction G based on an eye image and an eye model M according to an embodiment of the disclosure.

Referring to FIG. 9, in an embodiment, the electronic device 200 may identify the gaze direction G based on the eye image and eye model M.

In an embodiment, the electronic device 200 may identify the gaze direction G and position of the eye E based on the eye model M stored in the memory. The electronic device 200 may identify the gaze direction G from the eye image captured by the camera 210 under the assumption the position (denoted by dashed line) of the eye E of the stored eye model M. In an embodiment, the electronic device 200 may identify the area of the pupil P from the eye image, restore the circular shape P' of the pupil using the identified shape of the pupil P, and obtain the gaze direction G according to the rotation direction and rotation angle of the eye E based on the restored circular shape P' of the pupil. The electronic device 200 may update with the eye model M corresponding to the gaze direction G obtained in the position of the eye E of the stored eye model M based on the eye image.

FIG. 10 illustrates a process of detecting a change in the position of an eye E according to an embodiment of the disclosure.

Referring to FIG. 10, in an embodiment, the electronic device 200 may detect a reposition of the eye E by comparing the retina image I of the eye model M updated corresponding to the gaze direction G obtained based on the area of the pupil P identified from the eye image with the retina image I obtained from the eye image.

As an example, when the retina image I of the eye model M is identical to the retina image I obtained from the eye image, the electronic device 200 may detect that the position of the eye E is not changed, and, when the retina image I of the eye model M is different from the retina image I obtained from the eye image, the electronic device 200 may detect that the position of the eye E is changed.

In an embodiment, upon detecting that the position of the eye E is not changed, the electronic device 200 may obtain any of the gaze direction G and position of the eye E based on the eye model M.

Figure 11:
FIG. 11 illustrates a process of detecting a changed eye position according to an embodiment of the disclosure.

FIG. 11 illustrates a process of detecting a changed eye (E) position according to an embodiment of the disclosure.

Referring to FIG. 11, in an embodiment, the electronic device 200 may obtain the position of the eye E based on the retina image I and the eye model M. In an embodiment, the electronic device 200 may obtain the retina image I from the eye image. The retina image I may be a retina image I inside the eye E captured through the area of the pupil P according to the rotated position of the eye E.

In an embodiment, the electronic device 200 may estimate the pupil center line P.L. based on the area of the pupil P identified from the eye image. For example, the electronic device 200 may estimate the extending straight line of the 2D position of the area of the pupil P identified from the eye image as the pupil center line P.L.

In an embodiment, the electronic device 200 may estimate the pupil center line P.L. using the eye model M and the retina image I. Specifically, the electronic device 200 may estimate the pupil center line P.L. where the area of the pupil P of the eye model M is positioned by estimating the eye model M so that the retina image mapped to the eye model M corresponds to the retina image I obtained from the eye image. Further, the electronic device 200 may estimate the eye center line C.L. where the eye center point C.P. is positioned in the position spaced apart by the shape (e.g., radius R) of the pupil P from the circular shape P' of the pupil restored from the estimated pupil center line P.L.

In an embodiment, the electronic device 200 may estimate the center line of the eye E where the eye center point C.P. is positioned and estimate the eye center point C.P. based on the ratio (scale) of the retina image I obtained from the eye image and the retina image mapped to the eye model M. The electronic device 200 may update the eye model M based on the newly estimated eye center point C.P.

Figure 12:
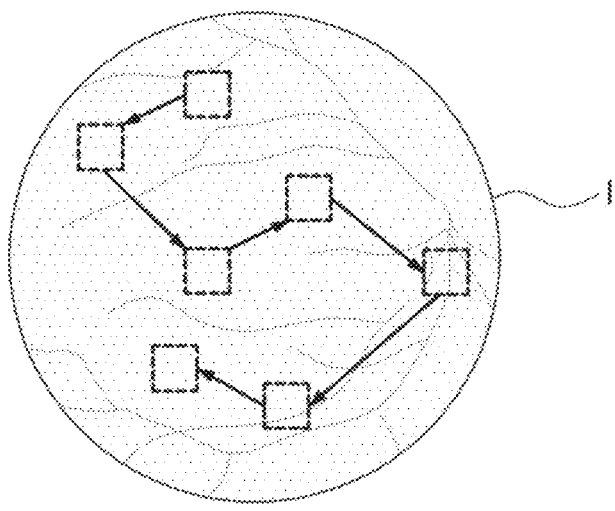
FIG. 12 illustrates an overall retina image of an eye model according to an embodiment of the disclosure.

FIG. 12 illustrates an overall retina image of an eye model M according to an embodiment of the disclosure.

Referring to FIG. 12, the electronic device 200 may obtain the eye model M by mapping a plurality of retina images I obtained according to rotation of the eye E, and the obtained eye model M may include an entire retina image produced by synthesizing the plurality of retina images I. The electronic device 200 may store the eye model M including the entire retina image in the memory.

In an embodiment, the electronic device 200 may determine whether the user is one corresponding to the stored eye model M based on the obtained retina image I. The electronic device 200 may determine whether the obtained image corresponds to a pre-stored eye image of the user, by identifying whether the retina image I obtained from the eye image obtained through the camera 210 corresponds to the retina image I stored in the eye model M previously stored in the memory. Specifically, the electronic device 200 may obtain the eye image through the camera 210, obtain the retina image I from the obtained eye image, and compare the obtained retina image I with the retina image mapped to the eye model M to determine whether the user is one corresponding to the eye model M.

In an embodiment, when the user newly wears or re-wears the electronic device 200, the electronic device 200 may determine whether the user is one whose eye model M is stored. As an example, the electronic device 200 may obtain a preset number of retina images I according to rotation of the eye E and identify whether the entire retina image mapped to the eye model M has areas respectively corresponding to the retina images I. Upon identifying that a preset number of, or more, retina images I are present in the entire retina image mapped to the eye model M, the electronic device 200 may determine that the user is the one of the eye model M.

In an embodiment, upon determining that the user is one whose eye model M is previously stored based on the obtained retina image I, the electronic device 200 may identify at least one of the gaze direction G or position of the eye E based on the previously stored eye model M and, upon determining that the user is not the one whose eye model M is previously stored, obtain a new eye model M based on the obtained eye image.

Figure 13:
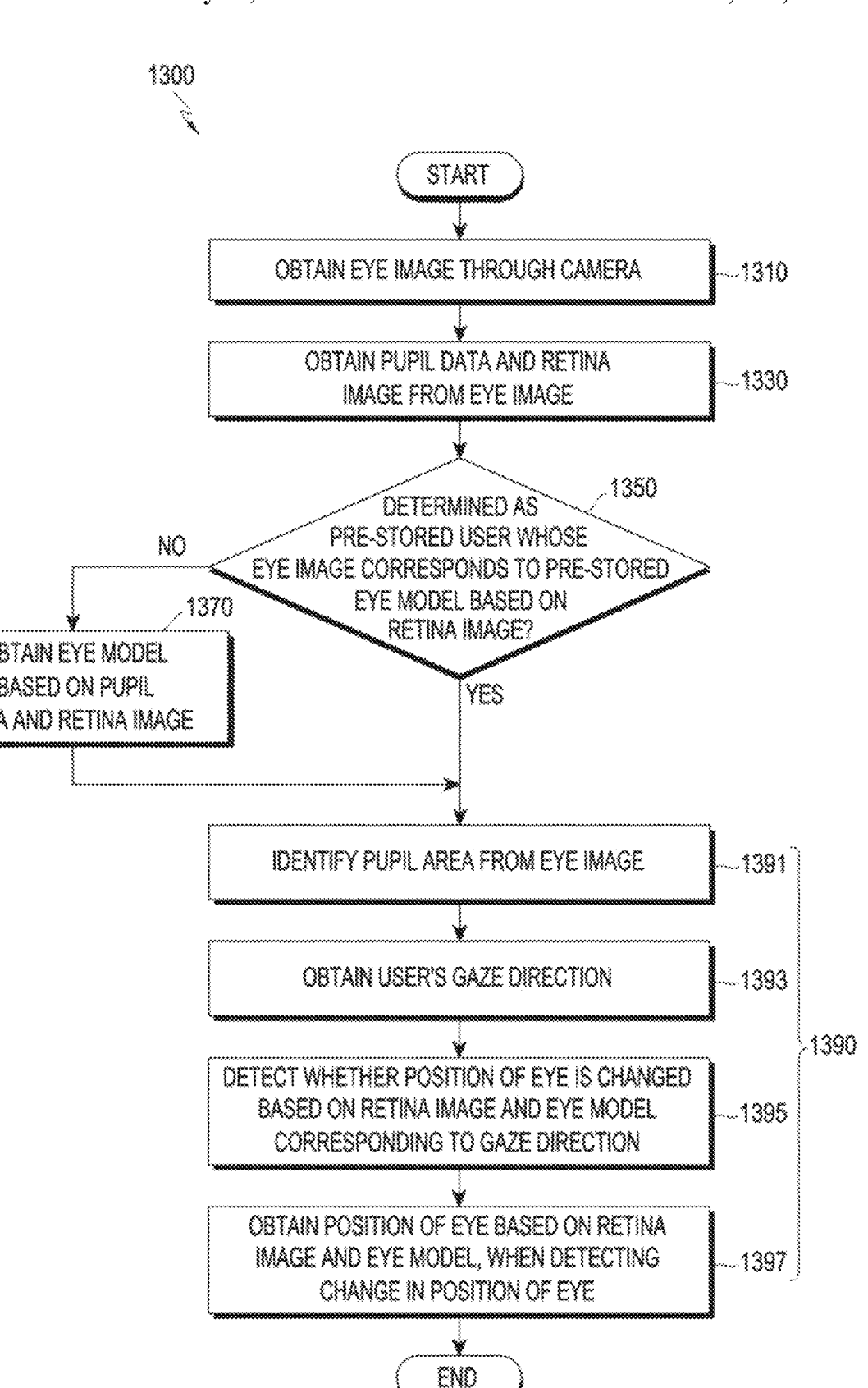
FIG. 13 is a flowchart illustrating a method for operating an electronic device according to an embodiment of the disclosure.

FIG. 13 is a flowchart 1300 illustrating a method for operating an electronic device 200 according to an embodiment of the disclosure.

Referring further to FIG. 13, according to an embodiment, the electronic device 200 may obtain the eye image of the user through the camera in operation 1310. In an embodiment, the electronic device 200 may obtain a plurality of eye images while sequentially displaying an object to induce the gaze of the user in different positions on the display.

According to an embodiment, in operation 1330, the electronic device 200 may obtain pupil data and retina images from the obtained eye image. In an embodiment, the electronic device 200 may obtain a plurality of respectively corresponding pupil data and retina images from the plurality of eye images. In an embodiment, the electronic device 200 may identify the area of the pupil from the eye image and obtain at least one of the position of the pupil, the shape of the pupil, or the gaze direction based on the identified area of the pupil. For example, the electronic device 200 may obtain the positional coordinates of the pupil, the lengths of the major axis and minor axis of the pupil shape, and the rotation information about the pupil and store them in the memory while simultaneously storing the retina images respectively corresponding to the pupil data.

According to an embodiment, in operation 1350, the electronic device 200 may determine whether the obtained eye image is that of a user corresponding to the pre-stored eye model based on the obtained retina image. In an embodiment, when the obtained eye image corresponds to the pre-stored eye model of the user, the electronic device 200 may identify at least one of the gaze direction or position of the eye, based on the pre-stored eye model. Here, there may be one or more user eye models previously stored.

In an embodiment, when the obtained eye image does not correspond to a pre-stored user eye model, the electronic device 200 may obtain an eye model based on the pupil data and retina image obtained from the obtained eye image in operation 1370. In an embodiment, the electronic device 200 may obtain a plurality of eye images while sequentially displaying an object to induce the gaze of the user in different positions on the display to obtain the eye model. In an embodiment, the electronic device 200 may display an object to induce to gaze on the display, in the position corresponding to an area where no retina image is obtained while creating the eye model from the obtained eye image.

In an embodiment, when the obtained eye image does not correspond to a pre-stored user eye model, the electronic device 200 may identify at least one of the gaze direction or position of eye corresponding to the eye image, based on the obtained eye model in operation 1390. Here, the obtained eye model may be an eye model obtained based on the eye image obtained in real-time or an eye model previously obtained and stored in the memory.

In an embodiment, the electronic device 200 may identify the area of the pupil corresponding to the pupil from the eye image in operation 1391 and obtain the gaze direction based on the identified area of the pupil in operation 1393. In an embodiment, the electronic device 200 may identify the area of the pupil from the eye image, restore the circular shape of the pupil using the position and shape of the area of the pupil, and obtain the gaze direction of the user.

In an embodiment, in operation 1395, the electronic device 200 may detect whether the position of the eye is changed based on the obtained retina image and the eye model corresponding to the obtained gaze direction. In an embodiment, upon determining that the position of the eye is not changed, the electronic device 200 may identify the position of the eye from the obtained eye model and update the eye model with the obtained gaze direction.

In an embodiment, upon detecting a reposition of the eye, the electronic device 200 may obtain the position of the eye based on the retina image and the eye model in operation 1397. In an embodiment, the electronic device 200 may estimate the pupil center line according to the pupil data and the eye center line spaced apart from the pupil center line by the radius of the eye and estimate the eye center point on the eye center line based on the ratio (scale) in size of the retina image and the eye model. In an embodiment, the electronic device 200 may update the eye model based on the newly estimated eye position.

According to an embodiment, any of the electronic device 101 and the electronic device 200 may comprise a camera and at least one of the processor 120 and the processor 220. The at least one of the processor 120 and the processor 220 may be configured to obtain an eye image of a user through the camera 210. The at least one of the processor 120 and the processor 220 may be configured to obtain pupil data and a retina image I from the obtained eye image. The at least one of the processor 120 and the processor 220 may be configured to obtain an eye model M including the retina image I, based on the obtained pupil data and the obtained retina image I. The at least one of the processor 120 and the processor 220 may be configured to identify at least one of a position or a gaze direction G of an eye E, based on the obtained eye model M.

According to an embodiment, any of the electronic device 101 and the electronic device 200 may further comprise a light source 240 emitting light of a preset wavelength band to the eye E. corresponding to the camera 210.

According to an embodiment, the at least one of the processor 120 and the processor 220 may be configured to receive a plurality of eye images according to rotation of the eye E from the camera 210. The at least one of the processor 120 and the processor 220 may be configured to obtain a plurality of pupil data and retina images I from the plurality of eye images. The at least one of the processor 120 and the processor 220 may be configured to obtain the eye model M, based on the plurality of pupil data and the plurality of retina images I.

According to an embodiment, any of the electronic device 101 and the electronic device 200 may further comprise a display 250. The at least one processor 120 or 220 may be configured to sequentially display an object to induce the gaze of the user in different positions on the display 250.

According to an embodiment, in any of the electronic device 101 and the electronic device 200, the at least one of the processor 120 and the processor 220 may be configured to identify area of a pupil P from the eye image. The at least one of the processor 120 and the processor 220 may be configured to obtain at least one of a position of a pupil P, a shape of the pupil P, or the gaze direction G based on the identified area of the pupil P.

According to an embodiment, in any of the electronic device 101 and the electronic device 200, the at least one of the processor 120 and the processor 220 may be configured to obtain the position of the eye E or a shape of the eye E, based on the obtained at least one of the position of the pupil P, shape of the pupil P, or the gaze direction G.

According to an embodiment, in any of the electronic device 101 and the electronic device 200, the at least one of the processor 120 and the processor 220 may be configured to obtain the eye model M by mapping the retina image I corresponding to the pupil data to the eye E to correspond to the pupil data.

According to an embodiment, in any of the electronic device 101 and the electronic device 200, the at least one of the processor 120 and the processor 220 may be configured to identify the at least one of the position or the gaze direction G of the eye E corresponding to the eye image, based on the obtained eye model M.

According to an embodiment, in any of the electronic device 101 and the electronic device 200, the at least one of the processor 120 and the processor 220 may be configured to determine whether the eye image corresponds to a pre-stored eye image of the user corresponding to a pre-stored eye model M, based on the obtained retina image I.

According to an embodiment, in any of the electronic device 101 and the electronic device 200, the at least one of the processor 120 and the processor 220 may be configured to identify area of a pupil P corresponding to the pupil P from the eye image. The at least one of the processor 120 and the processor 220 may be configured to obtain the gaze direction G based on the identified area of the pupil P.

According to an embodiment, in any of the electronic device 101 and the electronic device 200, the at least one of the processor 120 and the processor 220 may be configured to detect whether a position of the eye E is changed, based on the obtained retina image I and the eye model M corresponding to the obtained gaze direction G.

According to an embodiment, in any of the electronic device 101 and the electronic device 200, the at least one of the processor 120 and the processor 220 may be configured to obtain the position of the eye E, based on the retina image I and the eye model M. when detecting the change in the position of the eye E.

According to an embodiment, a method 1300 for operating any of the electronic device 101 and the electronic device 200 may comprise obtaining 1310 a user's eye image through a camera 210. The method 1300 for operating any of the electronic device 101 and the electronic device 200 may comprise obtaining 1330 pupil data and a retina image I from the obtained eye image. The method 1300 for operating any of the electronic device 101 and the electronic device 200 may comprise obtaining 1370 an eye model M including the retina image I, based on the obtained pupil data and the obtained retina image I. The method 1300 for operating any of the electronic device 101 and the electronic device 200 may comprise identifying at least one of a position or a gaze direction G of an eye E, based on the obtained eye model M.

According to an embodiment, in the method 1300 for operating any of the electronic device 101 and the electronic device 200, obtaining 1310 the eye image may receive a plurality of eye images according to rotation of the eye E from the camera 210. Operating 1330 the pupil data and the retina image I may obtain a plurality of pupil data and retina images I from the plurality of eye images. Obtaining 1370 the eye model M may obtain the eye model M, based on the plurality of pupil data and the plurality of retina images I.

According to an embodiment, in the method 1300 for operating any of the electronic device 101 and the electronic device 200, obtaining 1310 the eye image may obtain the plurality of eye images while sequentially displaying an object to induce a gaze of the eye E in different positions on a display 250.

According to an embodiment, in the method 1300 for operating any of the electronic device 101 and the electronic device 200, obtaining 1330 the pupil data and the retina image I may identify area of a pupil P from the eye image and obtain at least one of a position of a pupil P, a shape of the pupil P, or the gaze direction G based on the area of the pupil P. Obtaining 1370 the eye model M may obtain the position of the eye E or a shape of the eye E, based on the obtained at least one of the position of the pupil P, shape of the pupil P, or the gaze direction G.

According to an embodiment, in the method 1300 for operating any of the electronic device 101 and the electronic device 200, identifying 1390 at least one of the position or the gaze direction G of the eye E may identify at least one of the position or the gaze direction G of the eye E corresponding to the eye image, based on the obtained eye model M.

According to an embodiment, the method 1300 for operating any of the electronic device 101 and the electronic device 200 may further comprise determining 1350 whether the eye image corresponds to a pre-stored eye image of the user corresponding to a pre-stored eye model M, based on the obtained retina image I.

According to an embodiment, in the method 1300 for operating any of the electronic device 101 and the electronic device 200, identifying 1390 at least one of the position or the gaze direction G of the eye E may include identifying 1391 area of a pupil P corresponding to the pupil P from the eye image. Identifying 1390 at least one of the position or the gaze direction G of the eye E may include obtaining 1393 the gaze direction G based on the identified area of the pupil P.

According to an embodiment, in the method 1300 for operating any of the electronic device 101 and the electronic device 200, identifying 1390 at least one of the position or the gaze direction G of the eye E may include detecting 1395 whether a position of the eye E is changed, based on the obtained retina image I and the eye model M corresponding to the obtained gaze direction G. Identifying at least one of the position or the gaze direction G of the eye E may include obtaining 1397 the position of the eye E, based on the retina image I and the eye model M. when detecting the change in the position of the eye E.

According to an embodiment, in a non-transitory computer-readable storage medium storing one or more programs, the one or more programs may comprise obtaining 1310 a user's eye image through a camera 210. The one or more programs may comprise obtaining 1330 pupil data and a retina image I from the obtained eye image. The one or more programs may comprise obtaining 1370 an eye model M including the retina image I, based on the obtained pupil data and the obtained retina image I. The one or more programs may comprise identifying at least one of a position or a gaze direction G of an eye E, based on the obtained eye model M.

What is claimed is:

1. An electronic device comprising:
a camera; and
at least one processor configured to:
    obtain an eye image of an eye of a user from the camera,
    obtain pupil data and a retina image from the eye image,
    obtain, based on the pupil data and the retina image, an eye model comprising the retina image, and
    identify, based on the eye model, at least one of a position of the eye or a gaze direction.

2. The electronic device of claim 1, further comprising a light source configured to emit light of a preset wavelength band to the eye.

3. The electronic device of claim 1, wherein the at least one processor is further configured to:
    receive a plurality of eye images, comprising the eye image, according to rotation of the eye from the camera,
    obtain a plurality of pupil data, comprising the pupil data, and retina images, comprising the retina image, from the plurality of eye images, and
    obtain, based on the plurality of pupil data and the retina images, the eye model.

4. The electronic device of claim 3, wherein obtaining the retina images comprises obtaining a plurality of images of a retina inside an eyeball of the eye of the user, the plurality of images of the retina comprising a first image, of a first area of the retina, and a second image of a second area of the retina, the first area of the retina being at least partly different than the second area of the retina.

5. The electronic device of claim 4, wherein
    the plurality of pupil data being of a pupil of the eye of the user and comprising first pupil data and second pupil data,
    the first pupil data indicating a first position of the pupil, a first shape of the pupil, a first rotation direction of the eye, and a first rotation angle of the eye,
    the second pupil data indicating a second position of the pupil, a second shape of the pupil, a second rotation direction of the eye, and a second rotation angle of the eye,
    at least one of:
        the first position of the pupil is different than the second position of the pupil,
        the first shape of the pupil is different than the second shape of the pupil,
        the first rotation direction of the eye is different than the second rotation direction of the eye, and
        the first rotation angle of the eye is different than the second rotation angle of the eye,
    the eye model is a three-dimensional (3D) eye model in which at least the first area of the retina and the second area of the retina are modeled and mapped to ones of the first pupil data and the second pupil data with:
        the first area of the retina mapped to the first pupil data, and
        the second area of the retina mapped to the second pupil data.

6. The electronic device of claim 3, further comprising a display,
    wherein the at least one processor is further configured to sequentially display an object inducing the gaze of the user to different positions on the display.

7. The electronic device of claim 1, wherein the at least one processor is further configured to identify area of pupil from the eye image and obtain at least one of a position of a pupil, a shape of the pupil, or the gaze direction based on the area of the pupil.

8. The electronic device of claim 7, wherein the at least one processor is further configured to obtain, based on the at least one of the position of the pupil, the shape of the pupil, or the gaze direction, any one of the position of the eye or a shape of the eye.

9. The electronic device of claim 1, wherein the at least one processor is further configured to obtain the eye model by mapping the retina image to the pupil data.

10. The electronic device of claim 1, wherein the at least one processor is further configured to identify, based on the eye model, the at least one of the position of the eye or the gaze direction corresponding to the eye image.

11. The electronic device of claim 10, wherein the at least one processor is further configured to, based on the retina image, determine whether the eye image corresponds to a pre-stored eye image of the user corresponding to a pre-stored eye model.

12. The electronic device of claim 10, wherein the at least one processor is further configured to:
    identify, from the eye image, area of a pupil corresponding to the pupil; and
    obtain, based on the area of the pupil, the gaze direction.

13. The electronic device of claim 12, wherein the at least one processor is further configured to, based on the retina image and the eye model, detect whether the position of the eye (E) is changed.

14. The electronic device of claim 13, wherein the at least one processor is further configured to, based on the retina image and the eye model, obtain the position of the eye, when detecting the change in the position of the eye.

15. A method for operating an electronic device, the method comprising:
    obtaining an eye image of an eye of a user from a camera,
    obtaining pupil data and a retina image from the eye image,
    obtaining, based on the pupil data and the retina image, an eye model comprising the retina image, and
    identifying, based on the eye model, at least one of a position of the eye or a gaze direction.

16. The method of claim 15, wherein the obtaining the eye image comprises receiving, from the camera, a plurality of eye images, comprising the eye image, according to a rotation of the eye,
    wherein the obtaining the pupil data and the retina image comprises obtaining a plurality of pupil data, comprising the pupil data, and retina images, comprising the retina image, from the plurality of eye images, and
    wherein the obtaining the eye model comprises obtaining, based on the plurality of pupil data and the retina images, the eye model.

17. The method of claim 15, wherein the obtaining the pupil data and the retina image comprises identifying area of a pupil from the eye image and obtaining, based on the area of the pupil, at least one of a position of the pupil, a shape of the pupil, or the gaze direction, and wherein the obtaining the eye model comprises obtaining, based on the at least one of the position of the pupil, the shape of the pupil, or the gaze direction any one of the position of the eye or a shape of the eye.

18. The electronic device of claim 1, wherein the retina image is an image of a retina inside of an eyeball of the eye of the user.

19. The electronic device of claim 18, wherein the pupil data indicates at least one of a position of a pupil of the eye of the user, a shape of the pupil, a rotation direction of the eye, and a rotation angle of the eye, and the eye model is a three-dimensional (3D) eye model in which the image of the retina is mapped to at least one of the position of the pupil, the shape of the pupil, the rotation direction of the eye, and the rotation angle of the eye.

\* \* \* \* \*